United States Patent [19]

Smith

[11] 4,455,119

[45] Jun. 19, 1984

[54] TRAILER APPARATUS

[75] Inventor: Earl D. Smith, Phoenix, Ariz.

[73] Assignee: Dallas Smith Engineering Corp., Phoenix, Ariz.

[21] Appl. No.: 278,090

[22] Filed: Jun. 29, 1981

[51] Int. Cl.³ .............................. B60P 1/00; B60P 1/44; B60P 3/08; B61D 3/16

[52] U.S. Cl. ..................... 414/537; 410/14; 410/16; 410/19; 410/25; 410/28.1; 410/30; 410/93

[58] Field of Search ............ 410/6, 10, 13, 14, 15, 410/16, 17, 18, 19, 20, 21, 22, 23, 24, 24.1, 25, 26, 27, 28, 28.1, 29, 29.1, 30, 93; 414/537

[56] References Cited

U.S. PATENT DOCUMENTS

| | | | |
|---|---|---|---|
| 1,247,553 | 11/1917 | Linquist et al. | 410/16 X |
| 1,254,920 | 1/1918 | Mathias | 410/10 |
| 1,324,105 | 12/1919 | Daly | 410/16 |
| 1,809,557 | 6/1931 | Lishon | 410/28 X |
| 1,994,695 | 3/1935 | Dolan et al. | 410/26 X |
| 2,432,228 | 12/1947 | DeLano | 410/26 |
| 2,461,927 | 2/1949 | Schaldach et al. | 410/26 |
| 2,523,723 | 9/1950 | Santee et al. | 414/537 |
| 2,583,734 | 1/1952 | Francis | 414/537 X |
| 2,654,612 | 10/1953 | Francis | 410/28.1 |
| 2,667,377 | 1/1954 | Stuart | 410/24.1 X |
| 2,695,810 | 11/1954 | Demos | 410/26 |
| 2,782,076 | 2/1957 | Miller | 414/537 X |
| 2,797,960 | 7/1957 | Endres et al. | 414/537 X |
| 2,998,102 | 8/1961 | Deverich | 410/22 X |
| 3,933,258 | 1/1976 | Forsyth et al. | 410/13 X |

*Primary Examiner*—Robert B. Reeves
*Assistant Examiner*—Howard Beltran
*Attorney, Agent, or Firm*—Woodard, Weikart, Emhardt & Naughton

[57] ABSTRACT

A trailer apparatus is disclosed herein which includes tracks adjustably mounted within a trailer body and having a first position for the transporting of automobiles and a second position permitting the carrying of other types of cargo. The tracks are hingedly mounted to the inside of the side walls of the trailer body and pivot downwardly for the carrying of automobiles and upwardly against the side wall to permit the carrying of other types of cargo. Front and rear doors are provided on the trailer and incorporate a track for allowing the loading and unloading of automobiles onto the tracks within the trailer body.

1 Claim, 22 Drawing Figures

TRAILER APPARATUS

BACKGROUND OF THE INVENTION

1. Field of the Invention

The present invention relates generally to a trailer apparatus, and more particularly to a trailer which is specially adapted for transporting automobiles and which is convertible for the transportation of other types of products or cargoes.

2. Description of the Prior Art

A variety of trailers have been proposed in the prior art for the transportation of various goods. Some of these trailers have been specifically suited for carrying certain types of goods. A prime example of those types of trailers dedicated to a particular purpose are the trailers designed for the transportation of automobiles. Such trailers typically comprise a framework supported on a base and carrying several tracks over which the cars may be moved to place them on the trailer and remove them from the trailer. Such trailers typically have been relatively open and have included tracks which are rigidly fixed in the position for transporting automobiles. In certain types of these trailers, low sidewalls have been included to provide protection for the automobiles being carried.

These prior art trailers for transporting automobiles have been well suited for that purpose, but have not been appropriate for the transportation of other types of cargoes. Consequently, the utility of such trailers is limited, and there is a particular problem in that after the vehicles have been delivered to the destination, the trailer must "dead head," or in other words travel unloaded, back to the origin. Because of this fact, the use of such traliers is quite inefficient, and also the trailers are totally useless when automobiles are not intended to be transported.

Various other types of trailers have been proposed in the prior art for carrying cargoes. The typical trailer is a closed box having a pair of doors at the rear end for receiving cargo. Alternately, the doors may be placed at other locations, or the trailer may have partial openings to facilitate loading and unloading of cargo.

By contrast to the prior art, the present invention provides an enclosed trailer which is readily adapted for transporting other types of goods besides automobiles. This convertibility of enclosed trailers for carrying automobiles has not been available in the prior art structures. As a result, the present invention has the advantage that the trailer does not have to "dead head" back to its origin since it can quickly be converted to carrying other types of goods along that route. Also, the trailer need not lay idle while automobiles are not needed to be transported, since it can be used for other purposes and thus employed more frequently and more efficiently.

SUMMARY OF THE INVENTION

Briefly described in one aspect of the present invention, there is provided an enclosed trailer having tracks adjustably mounted therein to have a first position adapted for carrying automobiles, and a second position for permitting the trailer to carry other types of cargo. Front and rear doors are provided to facilitate access in loading and unloading automobiles onto the tracks within the trailer. In a particular embodiment, devices are provided for locking the automobiles into place along the tracks in the trailer.

It is an object of the present invention to provide a trailer apparatus adapted for carrying automobiles and the like.

It is another object of the present invention to provide an enclosed trailer which is suitable for transporting automobiles.

A further object of the present invention is to provide an enclosed trailer which is readily converted to permit the transporting of either automobiles or other types of cargo.

It is another object of the present invention to provide a trailer apparatus designed for the transportation of automobiles and including a track facilitating the loading and unloading of automobiles into the trailer.

Further objects and advantages of the present invention will become apparent from the description of the preferred embodiment which follows.

DESCRIPTION OF THE PREFERRED EMBODIMENT

Figure 1:
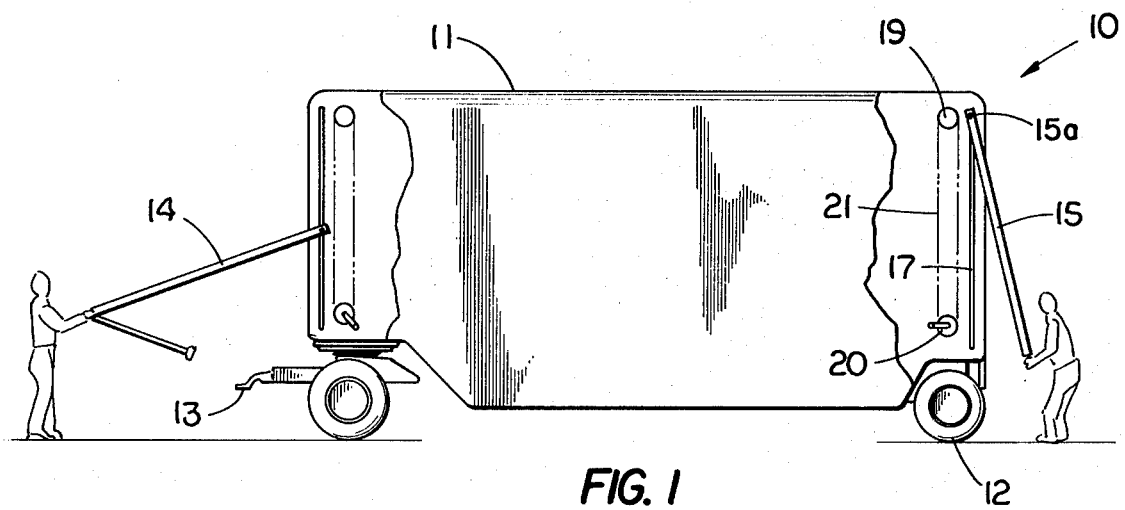
FIG. 1 is a side, elevational view of a trailer apparatus constructed in accordance with one embodiment of the present invention.
Figure 3:
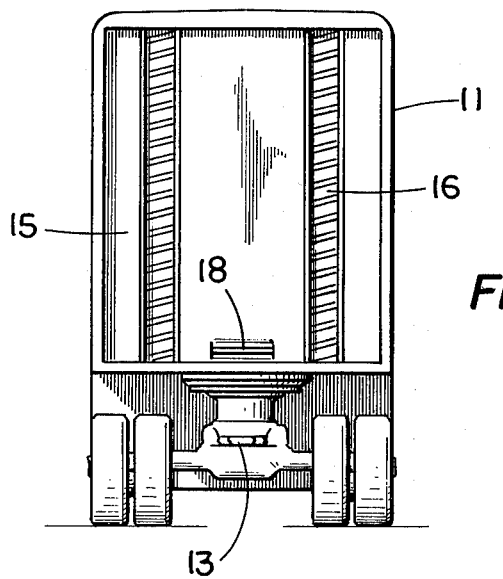
FIG. 3 is a rear, elevational view of the trailer of FIG. 1.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring in particular to FIGS. 1-7, there is shown a trailer apparatus 10 constructed in accordance with one embodiment of the present invention. For simplicity, the trailer and certain associated components are shown somewhat schematically, although it will be appreciated that the components may be readily constructed using standard trailers presently available. The trailer apparatus includes a body 11 supported in usual fashion by a pair of wheel and axle assemblies 12 for transporting the body along a road surface. As shown particularly in FIGS. 1 and 2, the body is upraised over the front and rear wheel and axle assemblies with the front assembly being somewhat larger and including a hitch 13 for connecting the trailer apparatus with a suitable truck cab or other towing device.

As will be further described, several pairs of tracks are pivotally mounted to the inside sidewalls of the body 11 to carry several automobiles in various positions within the trailer apparatus. Access to these tracks is achieved through the front and rear doors 14 and 15, respectively. The outer surfaces of these doors when in the closed position (FIG. 3) includes a pair of track portions 16 positioned to align with the tracks within the trailer apparatus when the doors are lowered into a loading position as shown particularly in FIG. 2. The front and rear doors include outwardly extending pins 15a received in vertical U-shaped channels 17 on opposed edges of the trailer body. The top ends of the doors are therefore slidable and pivotable relative these channels and relative the trailer body. Handles, such as the handle 18 (FIG. 3), are provided to facilitate raising the doors a short distance to permit the doors to be swung outwardly. Provisions are preferably made to retain the doors when in the closed position, such as by providing a lower, horizontal channel into which the bottom end of each door is received, or by other latching or locking devices as are common.

A counter balance, shown generally at 19, is also preferably provided to facilitate the raising and lowering of the front and rear doors. Most suitably, a crank assembly 20 with a suitable connection to the door, such as by a chain 21, is operable to raise and/or lower the front and rear doors.

Figure 4:
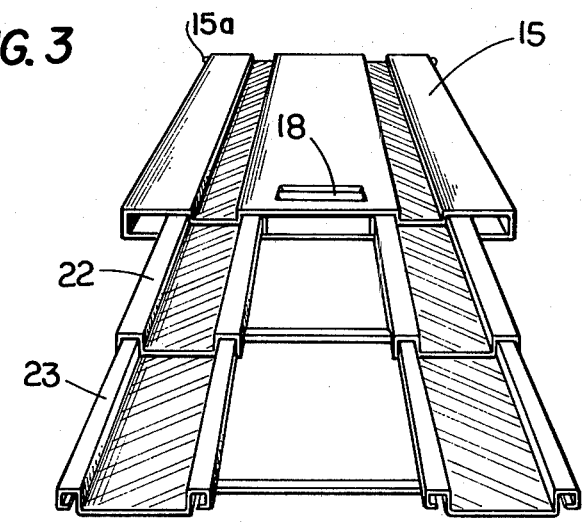
FIG. 4 is a rear, perspective view of the track assembly used in accordance with the trailer embodiment shown in FIG. 1.

As shown particularly in FIG. 4, a pair of telescoping track members 22 and 23 are received within the doors, such as rear door 15. Further, a pair of supports 24 and 25 are pivotally mounted, or detachably mounted, to the telescoping track assemblies to provide intermediate supports for the extended track as shown most particularly in FIG. 2. In another respect, the pins extending into the U-shaped channels 17 may be provided with a latch to lock the doors at various positions to accommodate different levels of automobile tracks in the trailer body.

Figure 5:
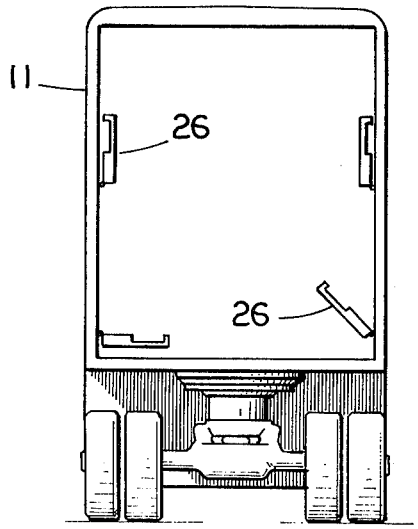
FIG. 5 is a rear, elevational view of the interior of the trailer of FIG. 1.
Figure 6:
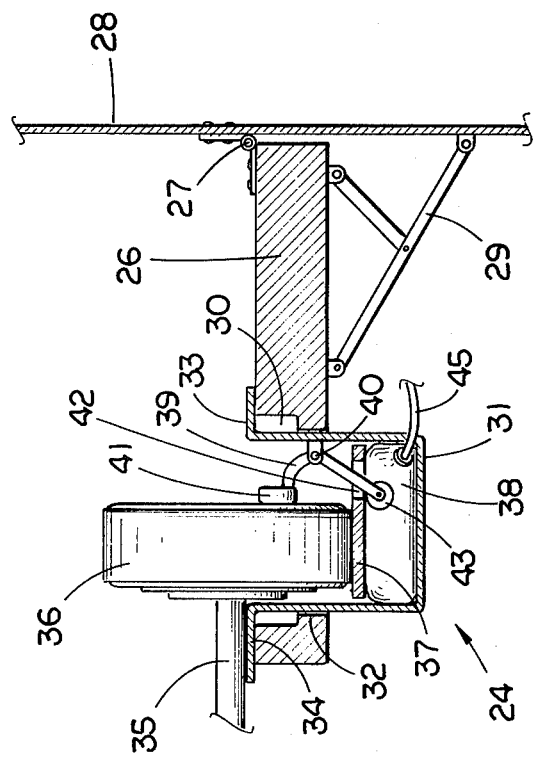
FIG. 6 is a partial, cross-sectional view of one embodiment of a locking means useful in accordance with the present invention.
Figure 7:
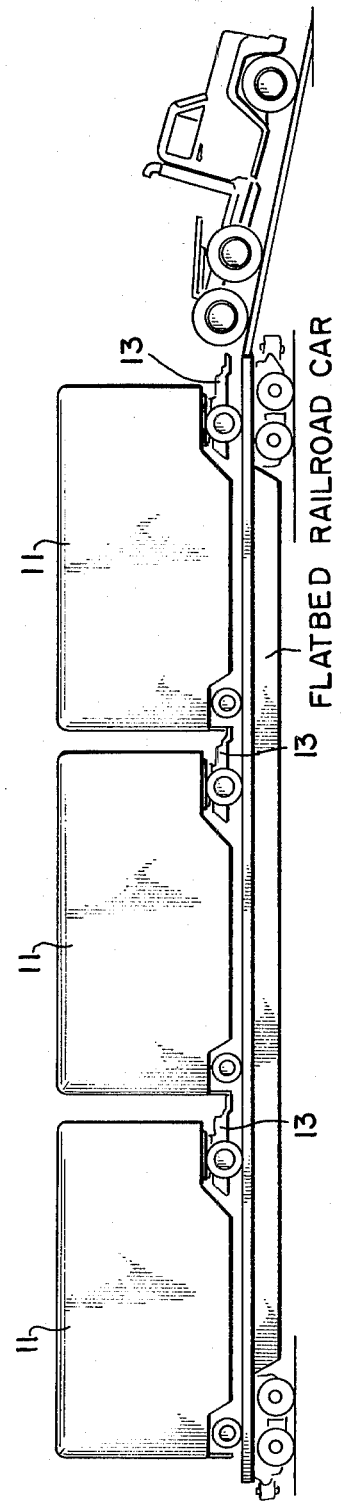
FIG. 7 is a side, elevational view of a number of trailers shown mounted on a railroad car.

Tracks are mounted to the body for providing a ramp connection between the tracks (26) within the trailer body and the supporting surface on which the trailer rides. This track enables the loading and unloading of vehicles onto the tracks within the trailer body. Referring in particular to FIGS. 5 and 6, the positioning and mounting of the tracks within the trailer body 11 are particularly shown. A first track is mounted within the body 11 for carrying vehicles within the body. This first track includes at least one pair of tracks having a first, extended position for supporting the vehicle, as shown generally at 24, and a second, retracted position shown generally at 25, for permitting the carrying of other cargo in the body. These tracks 26 are preferably mounted by hinges 27 (FIG. 6) permitting the tracks to pivot between the first and second positions. Hinges 27 are secured to the side wall 28 of the trailer body and also are secured directly to the tracks 26. A removable brace, such as 29, may be provided for supporting the track 26 in the extended or carrying position, or other suitable structure as would be well known in the art could be employed for this purpose. Similarly, a latch or other retaining mechanism (not shown) could be provided for holding the tracks 26 in the retracted or raised position, as would be apparent to those skilled in the art.

The tracks 26 include a channel portion 30 within which the vehicle tires ride. Further, a packet formed by a box 31 is received through a longitudinal opening 32 in the floor of the channel and is slidable vertically therein. Box 31 includes outwardly-extending flanges, 33 and 34 to facilitate sliding of the box relative to the opening in the channel. Also, the flange 34 may suitably be padded and is positioned to support the undercarriage 35 of the vehicle when the tires 36 are received within the box as shown in FIG. 6. The boxes 31 are typically provided to receive the front wheels of the vehicles, and the sliding action accommodates vehicles of different sizes. A bump or other indicator is preferably provided in the channel 30 to indicate when the rear tire of the vehicle has reached the proper position.

Each of the boxes 31 extends downwardly below the floor of the channel 30, and therefore provides a locking device for locking the vehicle in position on the tracks. A plate 37 is received within the box 31, and is movable up and down in response to suitable control devices. For example, an air bag 38 may be provided under the plate 37, and connects through a hose 45 to a suitable pressurized air source to inflate the bag and raise the plate 37 to the uppermost position even with the floor of the channel 30. When the vehicle tire rests upon the plate, the air bag is actuated so that the air is vented and the plate is allowed to move downwardly within the box to entrap the tire within the box with the undercarriage 35 resting on the flange 34 of the box.

As a further locking device, a C-shaped member 39 is hingedly mounted at 40 to the inside wall of the box. The upper arm of the C-shaped member includes a pad 41 positioned to engage the tire rim or other portion and lock against the rim to more firmly hold the vehicle in place. This locking action occurs due to the extension of the lower arm of the C-shaped member through a slot 42 and the inclusion of a roller 43 rotatably mounted to the lower arm below the plate 37. By this construction, the C-shaped member 39 will pivot about the hinge point 40 as the plate is raised and lowered. When the plate is lowered into the position shown in FIG. 6, the plate forces the roller 43 downward and causes the arm 39 to pivot until the pad 41 firmly engages an outer surface of the tire. When the air bag 38 is inflated, the plate is raised and the pad 41 does not firmly engage the tire so the vehicle may be freely moved along the channel of the track.

It will be appreciated that modifications to the disclosed embodiment could be readily provided without departing from the intent of the present invention. For example, other locking devices could be provided in known manners. Also, in the described embodiment, the airbag 38 could be replaced with other types of hydraulic or mechanical lifts having appropriate controls. Similarly, alternate constructions could be readily employed to provide the operation of the doors and of the tracks for providing a ramp connection between the tracks within the body and the outside support surface. It is also a feature of the present invention that the boxes are convenient for use in transporting vehicles by railroad car. As shown schematically in FIG. 7, the boxes may be readily loaded and retained on a flat bed railroad car and transported in this fashion to distant locations.

Figure 8:
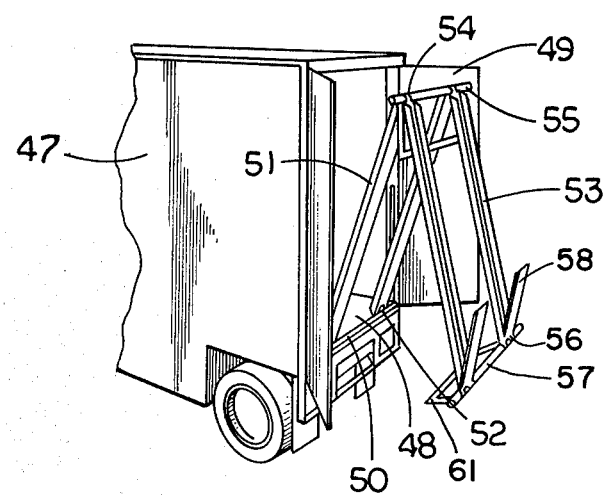
FIG. 8 is a partial, left rear perspective view of a trailer constructed in accordance with a preferred embodiment of the present invention, and particularly showing the tracks used for loading the trailer in a partially unfolded condition.
Figure 9:
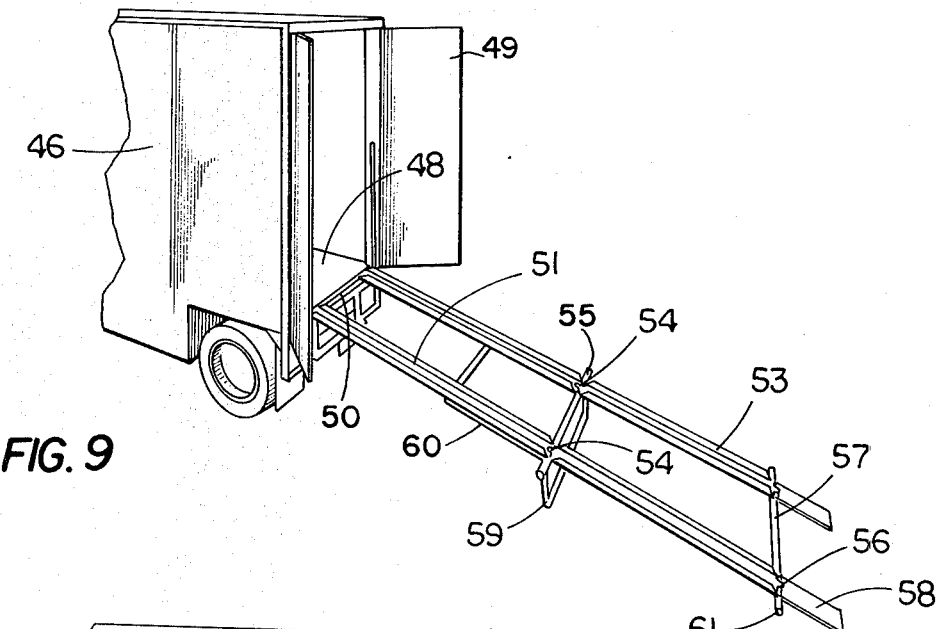
FIG. 9 is a partial, left rear perspective view of a preferred embodiment of the present invention, and particularly showing the tracks positioned for loading a vehicle to the lower portion of the trailer.
Figure 10:
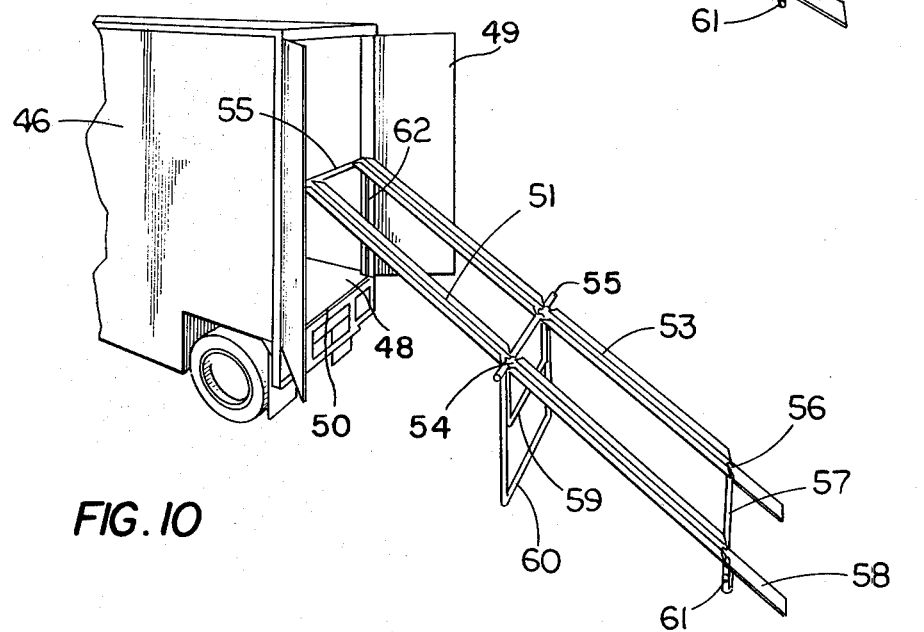
FIG. 10 is a left rear view of the preferred trailer apparatus, and particularly showing the tracks positioned for loading a vehicle to the upper portion of the trailer.

Referring to the embodiment shown in particular in FIG. 8 and the following figures, there is displayed the preferred embodiment of the present invention. The invention shown in those figures is in many respects identical or similar to that shown in FIG. 1-7, with certain modifications to the structure being made. Referring in particular to FIGS. 8-10 there is shown a trailer 46 having an enclosed body including a pair of side walls 47 and a floor 48. The body of the trailer has an end opening which is closeable by a pair of doors 49. A first rod portion 50 is mounted to the floor 48 of the trailer and a first pair of tracks 51 includes cylindrical portions 52 within which the rod portion 50 is received. This provides a hinged connection of the ends of the tracks 51 with the trailer. A second pair of tracks 53 and the other ends of the first pair of tracks 51 include cylindrical portions 54 within which a second rod portion 55 is received, thus providing a hinged connection of the ends of the tracks 51 with the ends of the tracks 53. The second tracks 53 similarly include cylindrical portions 56 within which is received a third rod portion 57. Rod portion 57 is also received within cylindrical portions forming a part of the end tracks 58 (FIG. 9). First and second support members 59 and 60 are mounted to the second rod portion 55, and a third support member 61 is mounted to the third rod portion 57. Due to the described construction, the support members 59–61 are rotatable with the respective rod portions to permit alignment of the support members in a position to provide support to the tracks with respect to the supporting surface.

As shown in FIG. 9, the tracks 51, 53 and 58 have a first position in which the tracks connect with and provide a ramp connection between the floor 48 and the exterior support surface. In this position, the first support member 59 is rotated into a position to provide a carrying support for the hinged connection of the tracks 51 and 53. The third support member 61 similarly provides a carrying support for the hinged connection of the tracks 53 and end tracks 58.

Figure 2:
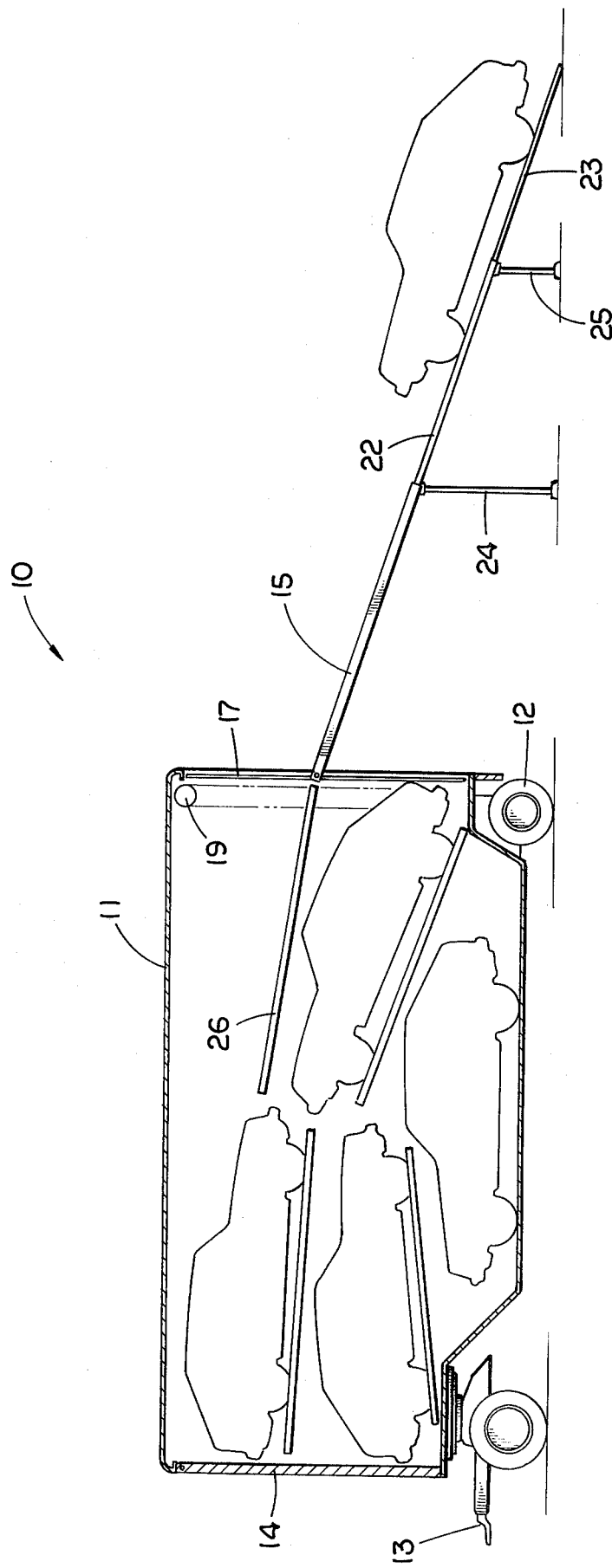
FIG. 2 is a cross-sectional view of the trailer apparatus of FIG. 1, and particularly showing the arrangement of tracks for loading a vehicle to one of the tracks within the trailer.

Referring in particular to FIG. 10, it is shown that the tracks have a second position for providing a ramped connection between the first track, as shown for example in FIG. 2, and the exterior support surface. Similar to the construction previously described, the first rod portion 55 preferably includes extensions which are received within slots 62 at either side of the trailer. Means may be provided for raising or lowering the rod portion 55 within the slot 62 to move the tracks between the positions shown in FIGS. 9 and 10. As shown in FIG. 10, in the elevated position of the first pair of track 51, the second support member 60 is rotated into position to provide a carrying support for the hinged connection of the tracks 51 and 53. The third support member 61 also is positioned to provide a carrying support for the hinge connection of tracks 53 and 58. As shown for example in FIG. 8, the hinged connection of the various track members permit the tracks to be folded up into a generally vertical orientation received within the trailer and retained therein by the doors 49 when in the closed position.

Figure 11:
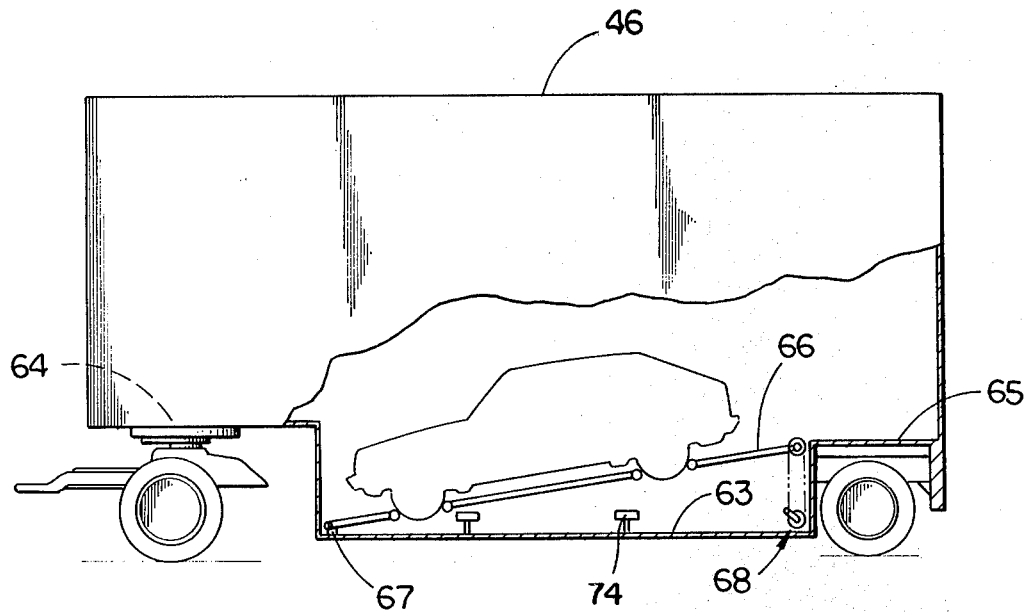
FIGS. 11 and 12 are side, cross-sectional views of the preferred trailer apparatus of the present invention, and particularly showing the mechanism for loading a car into the lowest portion of the trailer.
Figure 12:
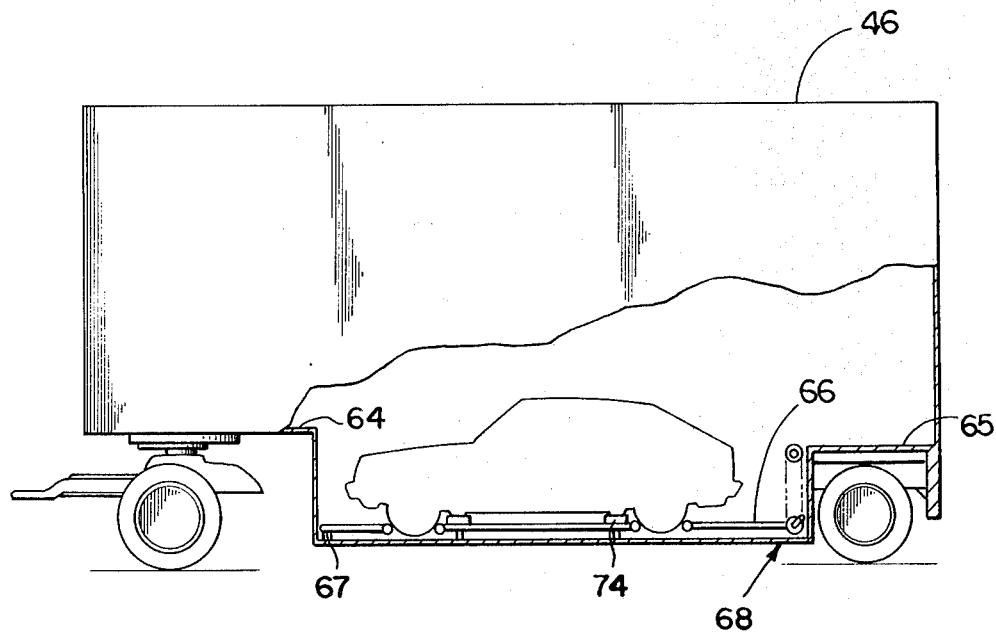

Referring now in particular to FIGS. 11 and 12, the preferred mechanism for positioning and retaining a car within the lower body portion of the trailer is shown. The trailer 46 preferably includes a center floor portion 63 and end floor portions 64 and 65. For reasons which will be described in detail in subsequent portions, the front end floor portion 64 is preferably higher than the rear end floor portion 65, and the center floor portion 63 is recessed below both of the end floor portions.

In order to position a car within the center floor portion of the trailer there is provided a floor member 66 which is attached to the center floor portion and is movable between first and second positions. In the first position, at least one end of the floor member 66 is positioned about even with one of the end floor members, or in particular the rear end floor member as shown in FIG. 11. The floor member 66 also has a second position in which both ends of the floor members 66 are recessed below each of the end floor members 64 and 65. Preferably, the attachment means is for hingedly attaching one end of the floor member 66 to the center floor portion 63. Shown in FIG. 11, a brace member 67 is secured to the center floor portion 63, and the floor member 66 is hingedly attached to the brace member 67 to be pivotable between the first and second positions shown in FIGS. 11 and 12. A crank mechanism 68 (FIG. 11) is provided and is operable in usual fashion to move the rear end of the floor member 66 in a vertical direction between the first and second positions.

Figure 13:
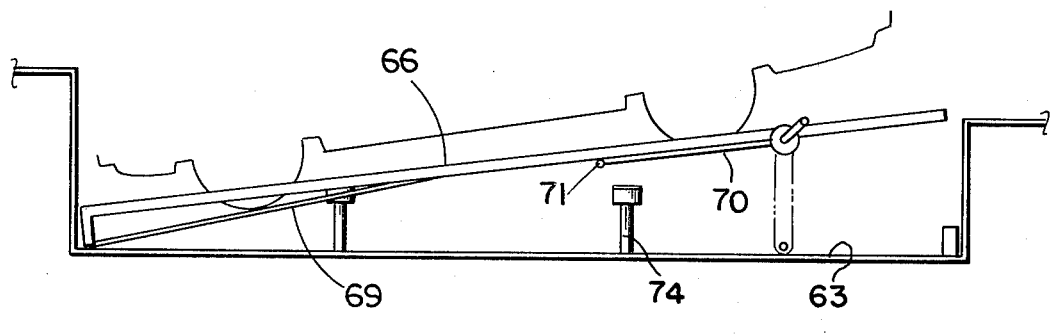
FIGS. 13-15 are partial, side cross-sectional views of a preferred embodiment of the trailer apparatus of the present invention, and particularly showing in greater detail a mechanism for loading and locking a vehicle into the lowest portion of the trailer.
Figure 14:
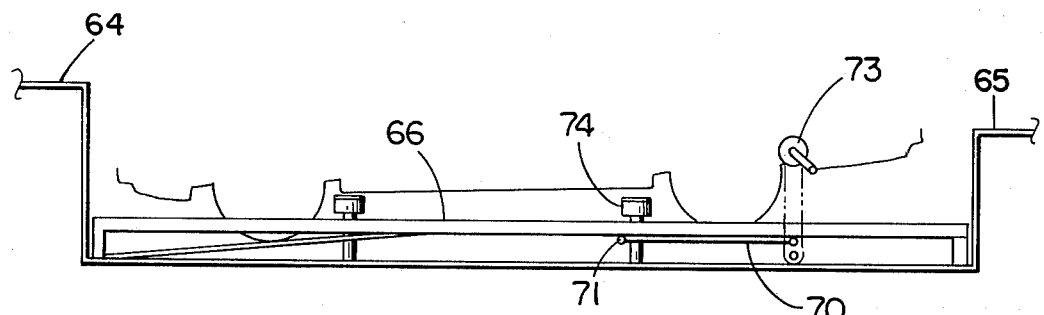
Figure 15:
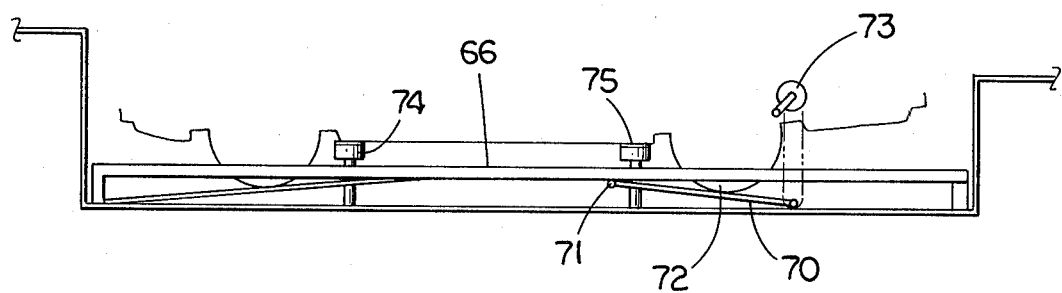
Figure 16:
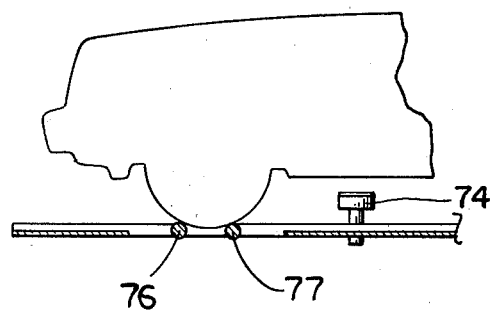
FIGS. 16-18 are partial, left side elevational views of a mechanism used in a preferred embodiment of the present invention for lowering a vehicle into a locked position for transportation within the trailer.
Figure 17:
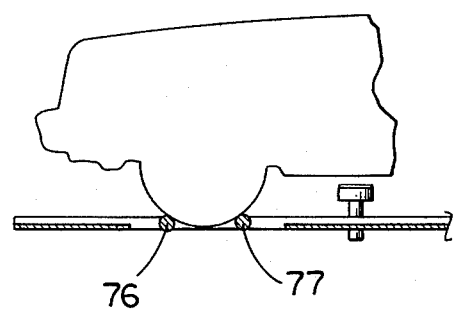
Figure 18:
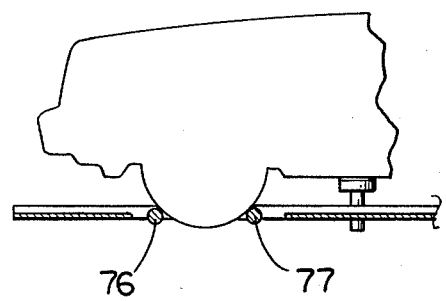
Figure 19:
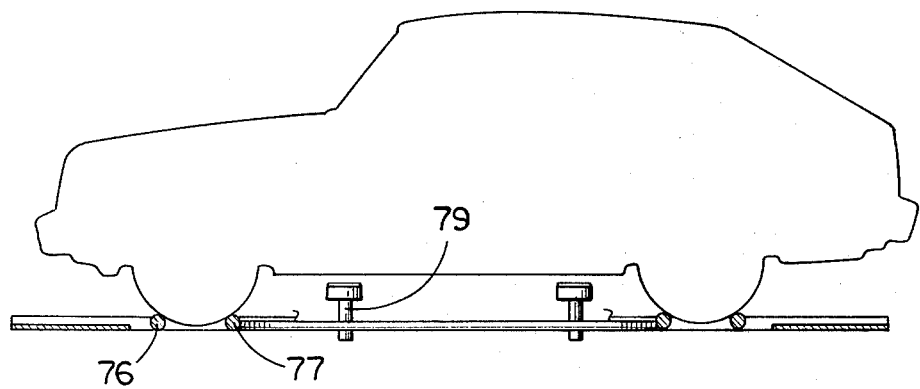
FIG. 19 is a partial, left side view of the locking apparatus useful in accordance with the present invention.

As will be further described, structure is provided for locking the vehicle relative to the floor member 66. One such locking device comprises several pairs of rollers which are movable relative one another to receive the vehicle wheels therebetween. This particular mechanism will be described in further detail in respect to subsequent drawings. An alternate embodiment is shown in FIGS. 13–15. As shown, the floor member 66 includes a pair of recessed track portions 69 which receive the front wheels of the vehicle and retain them below the upper surface level of the floor member 66. A pair of wheel support members 70 are mounted by a hinge 71 to the floor member 66. The wheel support members 70 are positioned to have the rear wheels 72 received thereon when the vehicle to be carried is in the proper position. A crank mechanism 73 is provided in usual fashion to provide for manual movement of the wheel support members 70 from a first, raised position (FIG. 14) to a second, recessed position (FIG. 15). In the latter position, the rear wheels are supported below the upper surface of the floor member 66. Four vehicle support blocks 74 are secured to the center floor portion 63 and preferably include pads 75 upon which the under carriage of the vehicle is supported as shown. The support blocks 74 are also mounted to the track previously described at the upper levels of the trailer, and operate in a similar fashion.

Referring now to FIGS. 16-20, there is shown a preferred embodiment of a locking device for retaining the vehicles in position upon the associated tracks. As shown in FIG. 12, this preferred locking device may be used in connection with the floor member 66 intended for carrying the bottom vehicle, or an alternate embodiment is proposed in FIGS. 13-15. As shown in the drawings, the locking device preferably includes several pairs of rollers, such as 76 and 77. The pairs of rollers are located such that the rollers are positionable on either side of each of the tires of the vehicle to be carried within the trailer. A locking device is provided which includes a mechanical movement for selectively moving the rollers of each pair toward and away from one another to provide a space therebetween for reception of the tires. It will be appreciated that various devices may be employed to control the relative closeness of the rollers for a given pair. In the preferred embodiment, the roller pairs are constructed so as to utilize the force which may be provided by the wheels of the transported vehicle in order to control the spacing of the rollers. Generally, the rollers are designed such that rotation of the wheels due to placing the vehicle in gear and thereby causing the wheels to rotate will result in appropriate movement of the rollers.

Figure 20:
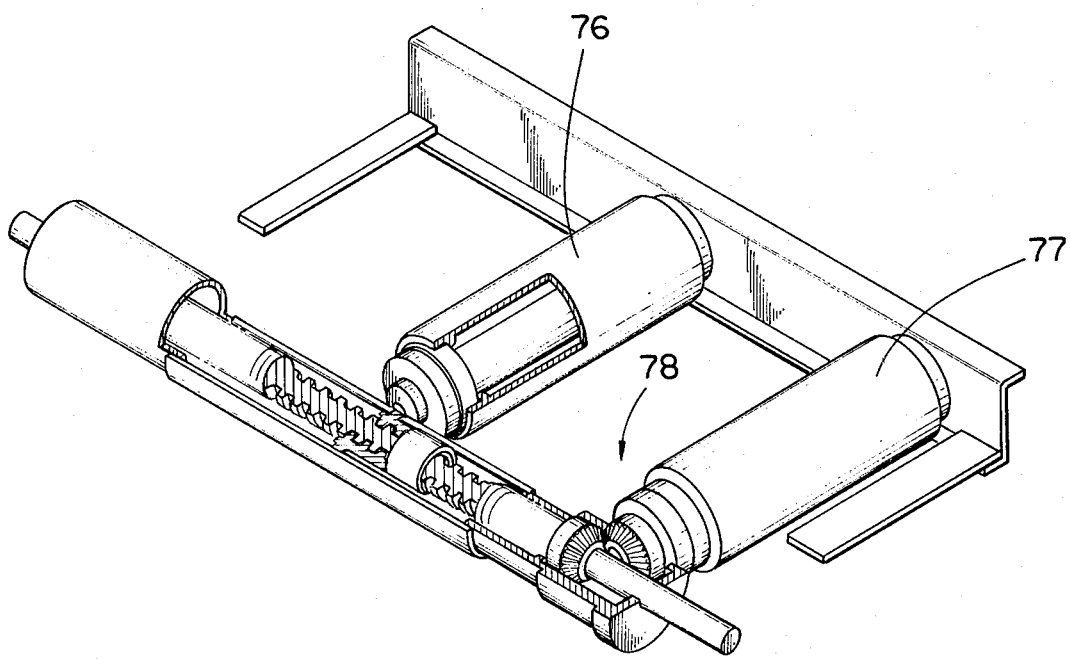
FIG. 20 is a partial, perspective view of the preferred locking mechanism for use in the present invention, and particularly showing the details of the gear connection used therein.

Referring in particular to FIG. 20, it is shown that the roller 77 is connected with a bevel gear arrangement 78 and the roller 76 is also connected to the worm gear such that rotation of roller 77 will drive roller 76 in a direction either towards or away from roller 77. In this fashion, rotation of the vehicle wheel in a first direction will drive the rollers 76 and 77 apart, and rotation of the vehicle wheel in the opposite direction will drive the rollers together. In the same fashion, and as shown somewhat schematically in FIG. 19, the worm gear extends or contracts and connects with a similar mechanism for the pair of rollers located with one or more of the other tires. Thus, rotation of the original vehicle wheel will provide a corresponding movement of the rollers for more than just the one pair of rollers located directly under that wheel. In this fashion, the mechanism is adaptable for use for both front and rear wheel drive vehicles and enables the use of the power provided by the vehicle itself to lower the vehicle down into a locked position and raise it back up into a free position for movement from the trailer. It will also be noted that support blocks, such as 79, are secured to the corresponding tracks in order to provide support for the vehicle when the rollers have spread sufficiently to lower the car onto the support blocks.

Figure 21:
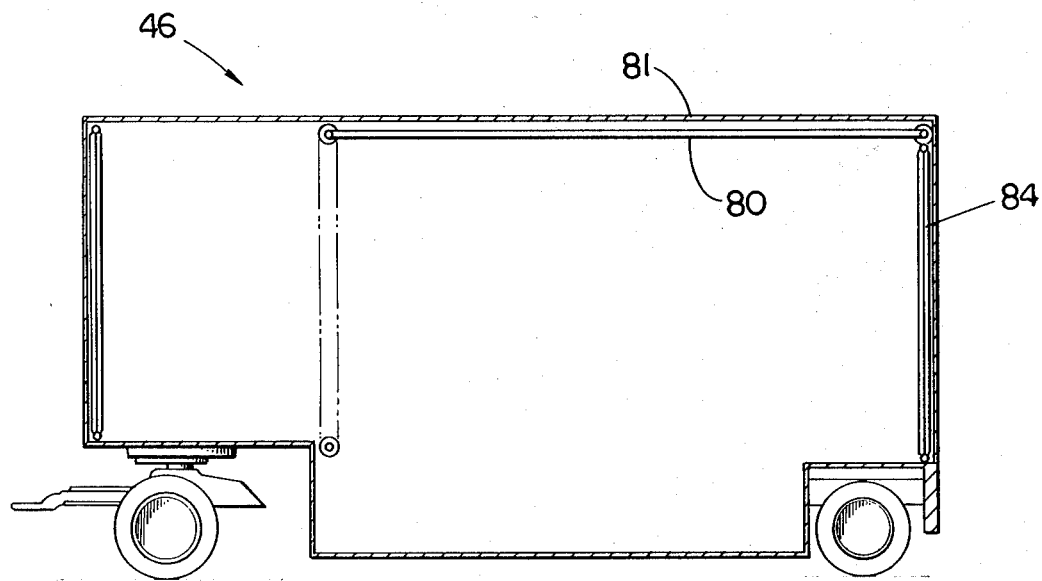
FIGS. 21 and 22 are left side, cross-sectional views of the preferred embodiment of the trailer apparatus of the present invention, and particularly showing the mechanism for providing a uniform floor for the carrying of cargo other than vehicles.
Figure 22:
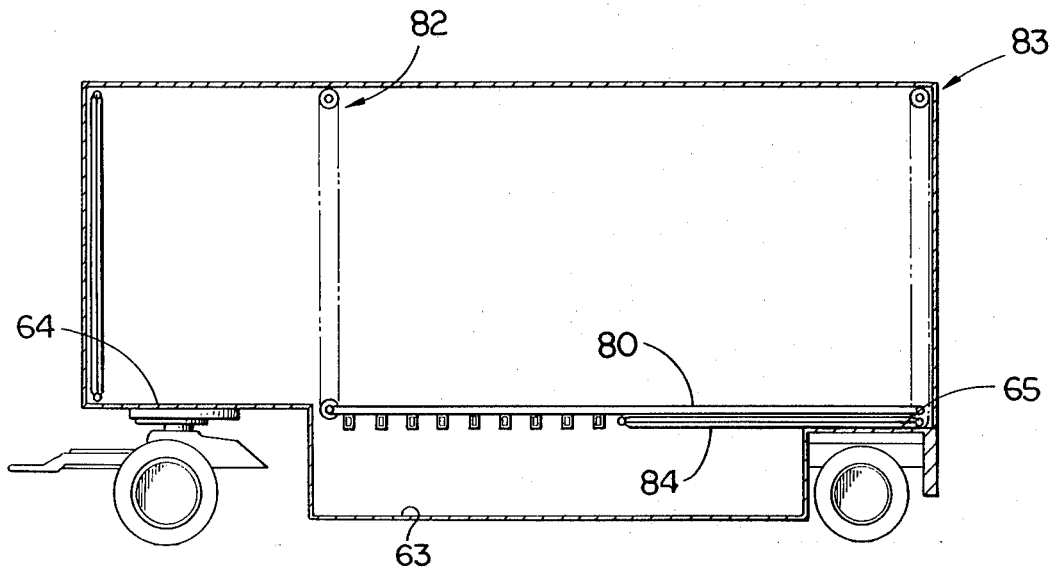

Referring to FIGS. 21 and 22, there is shown a preferred embodiment for a supplementary floor member 80 to enhance the use of the trailer for carrying cargo other than vehicles. The floor member 80 is mounted within the trailer 46 to be selectively positioned in one of two separate positions. In the first position, the floor member 80 is located adjacent the top 81 of the trailer which places the floor member out of the way of the vehicles being transported within the trailer. As shown somewhat schematically in FIG. 22, a pair of cranks 82 and 83 are provided to selectively move the floor member 80 from the first position of FIG. 21 to a second position shown in FIG. 22. These cranks may comprise any of various known assemblies to provide a translational movement of a member from a first position to a second position. For example, a worm gear arrangement as shown in FIG. 20 in connection with the roller movements would be a suitable mechanism for this purpose.

As shown in FIG. 22, the floor member 80 in the second position is located adjacent the end floor portions of the floor of the trailer. In this context, the word adjacent is intended to describe either the adjacency by horizontal alignment as is true with respect to the front end floor portion 64, or adjacency due to the close positioning of the two as is true with the rear end floor portion 65. As previously described, the rear floor portion 65 is recessed slightly below the front floor portion and therefore permits the arrangement shown in FIG. 22 to align in a horizontal plane the front end floor portion 64 and the top of the floor member 80. The slight recessing of the floor portion 65 also permits the track members, designated generally as 84, to be folded beneath the floor member 80 and thus out of the way for loading and unloading of the trailer.

It will be appreciated that the present invention provides a trailer apparatus which is particularly adapted for the transportion of vehicles, but which is also readily converted to transport other types of cargo. As a result, the trailer apparatus may be used much more efficiently since the trailer can be used for other goods during idle periods, and also can be used to transport other goods to prevent "dead heading" back to the origin when vehicles have been transported to an initial destination.

What is claimed is:

1. A trailer apparatus, for transporting vehicles and other types of cargo, which comprises:
   an enclosed body including a pair of upstanding side walls and a floor;
   a door mounted to an end of said body;
   wheel means connected with said body for carrying said body along a support surface;
   hitch means connected with one of said body and said wheel means for connecting said body with a towing vehicle;
   first track means mounted within said body for carrying vehicles within said body; and
   second track means mountable to said body for providing a ramp connection between said first track means and the support surface to enable the loading and unloading of vehicles onto said first track means,
   said first track means including at least one pair of tracks having a first, extended position for supporting a vehicle and a second, retracted position for permitting the carrying of other cargo in said body,
   said apparatus further including locking means for locking a vehicle in position on the pair of tracks, said locking means including several pairs of rollers, each pair of rollers being positionable one roller on each side of one of the tires of a vehicle to be carried within said apparatus, said locking means further including moving means for selectively moving the rollers on each pair toward and away from one another to provide a space therebetween for reception of the tire, said body including support means positioned beneath a vehicle being transported by said apparatus, whereby the vehicle rests upon and is supported by said support means when the pairs of rollers are spaced apart to receive the vehicle's tires therebetween said moving means including connector means for connecting one roller in a pair of rollers with the other roller in the pair of rollers and for causing the rollers to move toward and away from each other upon rotation of one of the rollers, said moving means including gear means drivingly connecting at least a first roller of one of said pairs of rollers with at least a second roller on one of said other pairs of rollers, whereby rotation of said first roller causes rotation of said second roller to provide control of the spacing of the rollers in the respective pair of rollers.

* * * * *